UNITED STATES PATENT OFFICE.

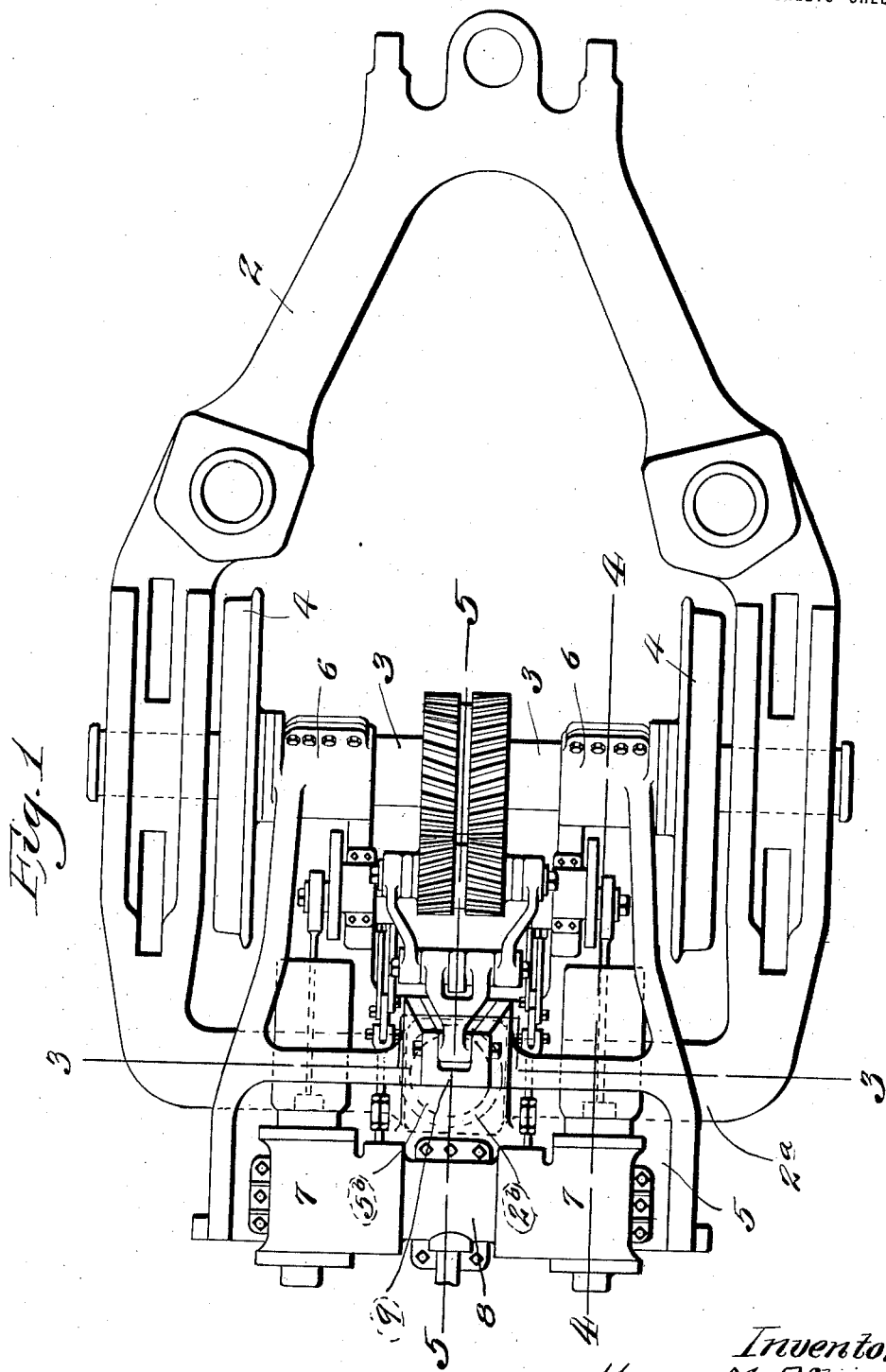

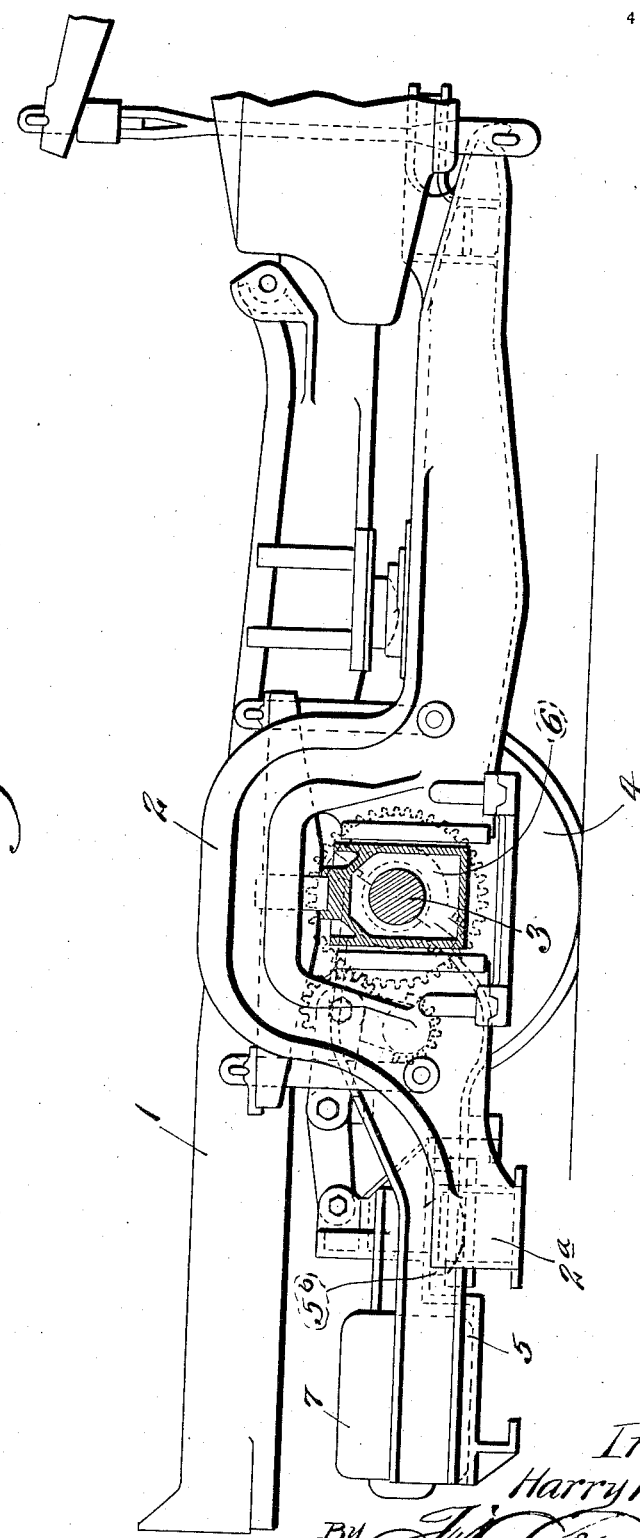

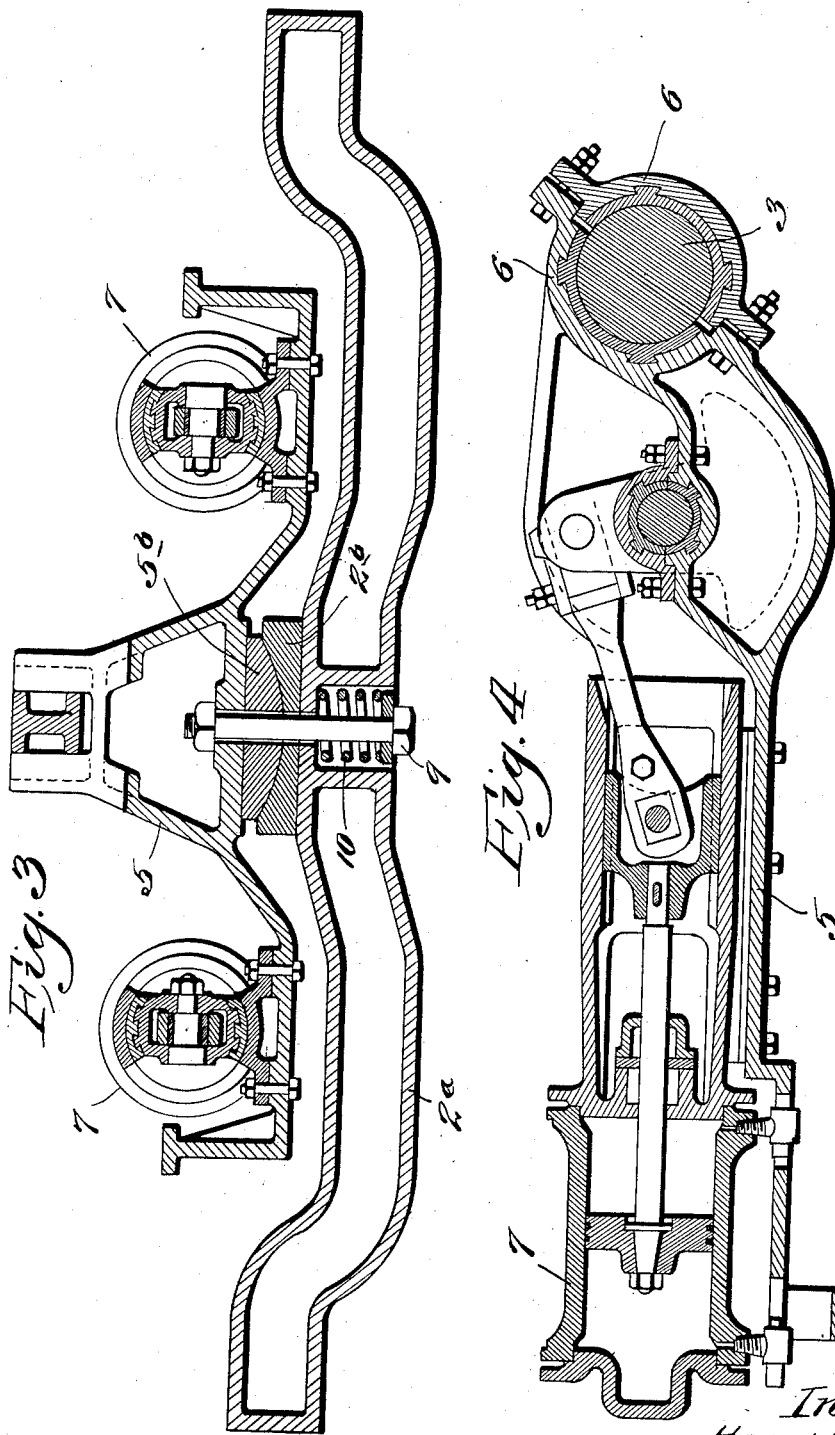

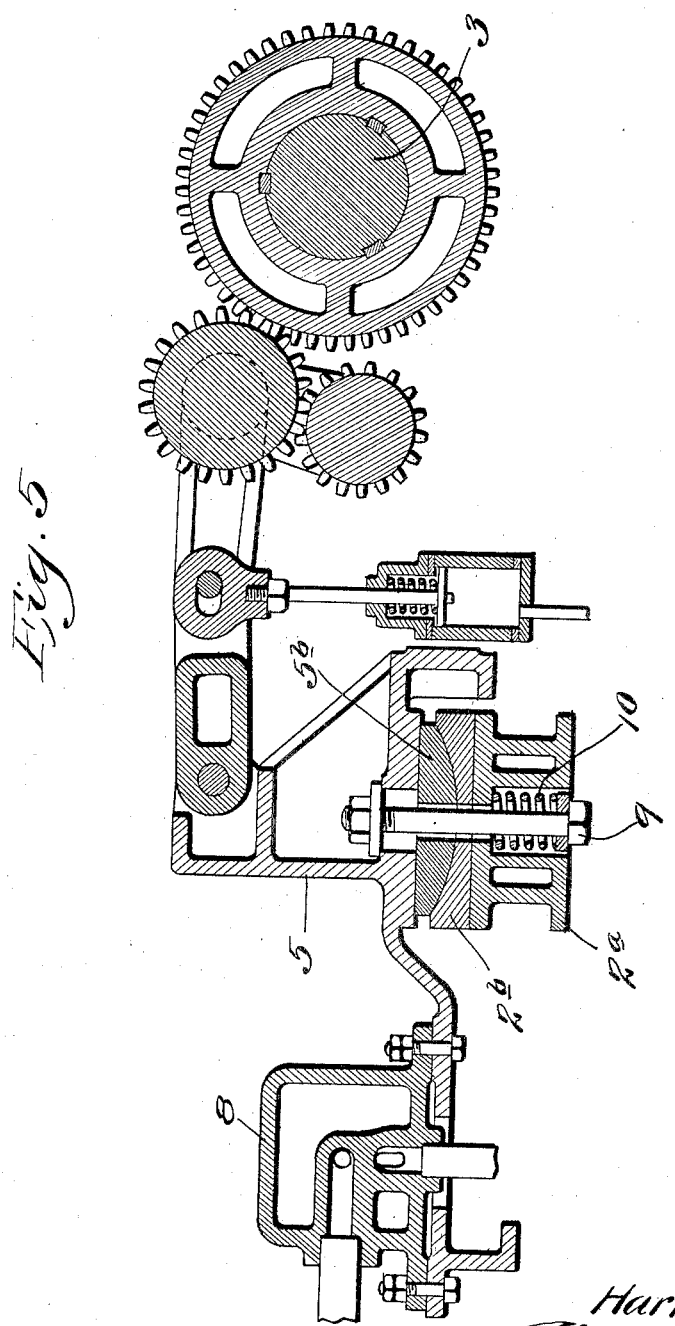

HARRY M. PFLAGER, OF ST. LOUIS, MISSOURI.

MOUNTING FOR LOCOMOTIVE BOOSTER-MOTORS.

1,357,928.   Specification of Letters Patent.   Patented Nov. 2, 1920.

Application filed August 6, 1919. Serial No. 315,612.

*To all whom it may concern:*

Be it known that I, HARRY M. PFLAGER, a citizen of the United States, residing at the city of St. Louis and State of Missouri, have invented a certain new and useful Improvement in Mountings for Locomotive Booster-Motors, of which the following is a full, clear, and exact description, such as will enable others skilled in the art to which it appertains to make and use the same, reference being had to the accompanying drawings, forming part of this specification, in which—

Figure 1 is a top plan view of my improved mounting for locomotive booster motors.

Fig. 2 is a side elevational view of the same.

Fig. 3 is a cross sectional view on line 3—3 of Fig. 1, and

Fig. 4 is a longitudinal sectional view on line 4—4 of Fig. 1.

Fig. 5 is a longitudinal view on the line 5—5 of Fig. 1.

This invention relates to a new and useful improvement in the maner of mounting locomotive booster motors on trailer trucks, the object being to enable the trailer truck to function in the usual way and at the same time preserve the proper relation between the booster motor and the axle of the trailer truck.

My invention is designed particularly for use in connection with booster motors for locomotives such as shown and described in an application filed by Howard L. Ingersoll October 2, 1917, Serial No. 194,335.

In the drawings, 1 indicates a portion of the locomotive frame and 2 the frame of a trailer truck. It will be observed with respect to this trailer truck construction that it is pivotally connected to the engine frame at its forward end and near its rear end there are pedestal jaws in which are mounted journal boxes capable of vertical movement therein, said journal boxes receiving the ends of the trailer truck axle 3 on which are mounted the trailer truck wheels 4.

5 indicates the booster motor bed-plate or frame, preferably made of a casting having bearings 6 located at its forward end, which bearings embrace the axle 3, said bearings, of course, permitting the free rotation of the axle therein. The bed plate 5 has bolted or otherwise secured to it cylinders 7 and steam chest 8, and provides a mount for other parts connected with the booster motor which it is unnecessary to describe here, as the same form no part of this invention.

Referring to Fig. 3 it will be observed that the rear cross-piece $2^a$ of the trailer truck frame is provided with a bearing plate $2^b$, with which bearing plate coöperates a bearing member $5^b$ loosely arranged under the engine bed plate 5.

9 indicates a king-bolt passing through the bed-plate 5, the bearings members $5^b$—$2^b$ and the cross-bar $2^a$ of the trailer truck frame, there being a spring 10 encircling the lower end of this king-bolt and arranged between a washer supported by the lower head of the bolt and the top wall of a downwardly opening recess or housing formed in the cross-bar $2^a$ to receive the spring. The energy of this spring is exerted at all times to hold the parts together, and it constitutes in effect an antirattler.

By referring to Fig. 3, it will be observed that the bed-plate 5 straddles the bearing formed by the members $5^b$—$2^b$, and there is a space between each side of the bed plate and the cross-bar $2^a$ of the trailer truck frame, so that the bed-plate may tilt or rock and accommodate the tilting or rocking movements of the trailer truck frame. By referring to Fig. 5, it will be observed that the opening in the bed-plate 5 through which the king-bolt 9 passes is elongated, this being for the purpose of permitting the vertical movement of the forward end of the engine frame, which vertical movement reduces the constantly changing radii of said forward end with respect to the rocking bearing of the bed-plate. To accomplish this, the bed-plate may slide forwardly and backwardly on the bearing plate $5^b$.

By the construction above described, it will be seen that the axle 3 is free to move vertically at each end in its bearing relation to the pedestal jaws of the trailer truck frame; that any vertical movement of the axle either bodily or a tilting movement thereof will carry with it the forward end of the bed plate 5, and consequently it may be said that the bed-plate is tilted, canted or moved vertically at its forward end with the axle and by virtue of the wide spread of the bearings 6, this tilting, canting or vertical movement of the axle is practically communicated to the entire bed-plate.

The rocking bearing formed by the plates 5ᵇ—2ᵇ supports the rear end of the bed-plate on the cross-bar of the trailer truck frame, and at the same time permits the bed-plate to rock on said cross bar in accommodating itself to the tilting and canting movement of the axle. The sliding relation between the bed-plate 5 and the bearing plate 5ᵇ permits the forward end of the bed-plate to move vertically in following the axle which, as usual, is mounted for vertical movement between the pedestal jaws of the trailer truck, there being springs, as usual, for yieldingly supporting the load on the trailer truck axle.

It will be noted, further, that the bed-plate is supported at three points, two of these points or bearings maintaining the proper relation between the bed plate and the axle, whereby the driving gears or pinions are always kept in proper mesh, and that the third point of support for the bed-plate is in the nature of a universal or rocking support which enables proper freedom of movement of the trailer truck frame and the bed plate while operating under service conditions.

What I claim is:

1. In a mounting for booster motors for locomotives, the combination of a truck frame, truck wheels and their axle, a booster motor bed-plate mounted on the axle, said axle having vertical movement relative to said truck frame and a rocking bearing interposed between said booster motor bed-plate and the truck frame.

2. In a mounting for mooster motors for locomotives, the combination of a truck frame, truck wheels and their axle, said axle having vertical movement relative to said truck frame and a booster motor bed-plate provided with three points of support two of which are on said axle, the third being a sliding and rocking hearing on said truck frame.

3. In a mounting for booster motors for locomotives, the combination of a truck frame, truck wheels and their axle, said axle having vertical movement relative to said truck frame and a booster motor bed-plate provided with three points of support two of which are on said axle and one of which is on said truck frame, said latter bearing permitting said truck frame to partake of movements independent of said motor bed-plate.

4. In a mounting for booster motors for locomotives, the combination of a truck frame, truck wheels and their axle, a booster motor bed-plate having bearings spaced apart and engaging said axle near said truck wheels, respectively, a rocking bearing interposed between said booster motor bed-plate and said truck frame, a king-bolt passing through said rocking bearing, and a spring coöperating with said king bolt and tending to keep the members of said rocking bearing together.

5. A truck frame having a downwardly opening housing or recess formed in its rear cross-bar, a bearing plate member arranged thereon above said housing or recess, a bed-plate provided with a coöperating bearing plate member, a king-bolt passing through said parts, and a spring surrounding said king-bolt.

6. In a mounting for booster motors for locomotives, the combination of a truck frame, truck wheels and their axle, said axle having vertical movement relative to said truck frame, a booster motor bed-plate mounted on the axle, and a sliding bearing between said bed-plate and said truck frame for accommodating a constantly changing radius of the truck frame with respect to the bearing of the motor bed-plate thereon.

7. In a mounting for booster motors for locomotives, the combination of a truck frame, truck wheels and their axle, a booster motor bed-plate mounted on the axle, and a sliding and rocking bearing between said bed-plate and said truck frame.

8. In a mounting for booster motors for locomotives, the combination of a truck frame, truck wheels and their axle, a booster motor bed-plate mounted on the axle, and a rocking bearing interposed between said booster motor bed-plate and the truck frame, said bearing comprising coöperating concavo-convex members, the parts being so constructed that the bed plate at the point of said bearing has a sliding movement relative to the truck frame.

In testimony whereof I hereunto affix my signature this 1st day of August, 1919.

HARRY M. PFLAGER.